Figure 1:
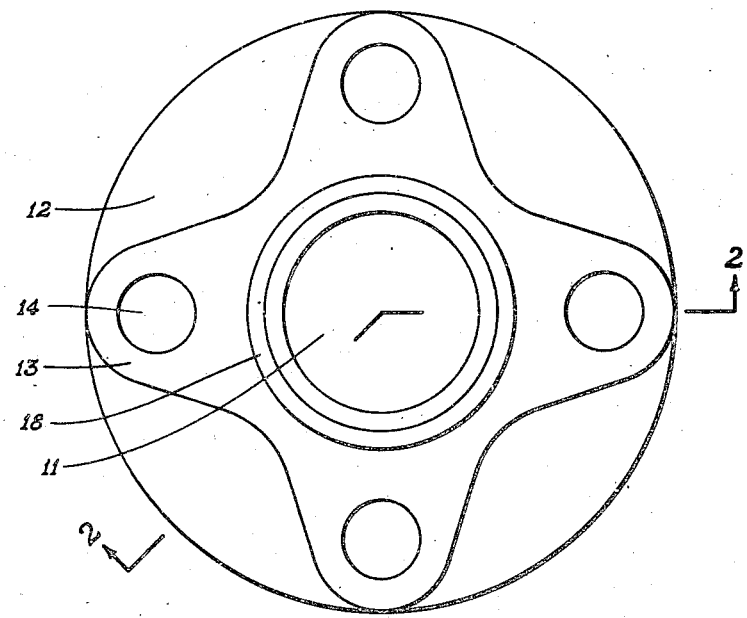

Dec. 10, 1946.  O. B. AMLEY ET AL  2,412,487
THERMOPLASTIC PIPE FLANGE
Filed Jan. 3, 1944

INVENTORS
Oliver B. Amley
John B. Gregory
BY
Griswold & Burdick
ATTORNEYS

Patented Dec. 10, 1946

2,412,487

UNITED STATES PATENT OFFICE 2,412,487

THERMOPLASTIC PIPE FLANGE

Oliver B. Amley, Bay City, and John B. Gregory, Midland, Mich., assignors to The Dow Chemical Company, Midland, Mich., a corporation of Michigan Application January 3, 1944, Serial No. 516,766

2 Claims. (Cl. 285—137)

This invention relates to plastic flanges useful in connecting sections of pipe.

In the assembling of piping systems for the transfer of fluids it is frequently desirable to use pipe constructed of plastic substances, such as cellulose derivatives, phenol-formaldehyde resins, and the polymers or copolymers of vinyl chloride, vinylidene chloride, or polystyrene. Pipe constructed of such plastic materials has many advantages for certain purposes in the way of flexibility, resistance to chemical action, and, in certain instances, of availability over special metals or metal alloys required for particular applications. In the assembling of such plastic piping systems considerable difficulty has heretofore been experienced in securing tight joints between pipe sections with plastic flange unions when using flanges constructed from thermoplastic substances and leakage through the union has usually occurred at pressures considerably below the working pressure of the pipe. It is thought that such difficulty is due to the somewhat flexible nature of thermoplastic polymers, copolymers, and resins and that it is thus not possible to draw down the flanges sufficiently tight with flange bolts to secure a tight joint at all points between the bolts. The disadvantages of using metal backing rings for thermoplastic flanges or of relying entirely on the stiffer but more slowly produced and more expensive flanges constructed from thermosetting substances are equally apparent. Attempts have been made to provide leakproof thermoplastic flange unions by using extra heavy flanges but these consume undesirably large amounts of material and even then freedom from leakage is not always assured.

It is, therefore, an object of the present invention to provide a thermoplastic flange useful in joining together sections of pipe to produce a fluid-tight joint.

It is an additional object to provide a plastic flange union, the flange members of which have working face surfaces of such configuration that they may be drawn together to form a fluid-tight union.

These and related objects are accomplished readily by molding, or otherwise forming, a flange member having a central bore, which may, if desired, be threaded to receive a threaded pipe, and having a working face, the surface of which consists of a narrow inner section lying immediately around the bore and in a plane perpendicular to the axis of the bore, and an outer section which recedes outwardly from the bore and which is inclined in the direction of the body of the flange at an angle to the plane of the first section. The outer section of the flange face thus assumes the shape of a portion of the surface of a very flat cone.

Figure 2:
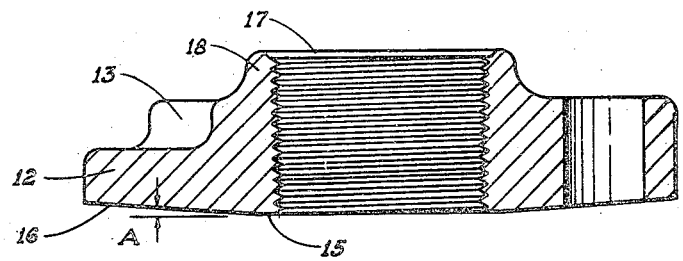

Reference is made to the accompanying drawing in which, in the interest of clarity, certain features are shown on a somewhat exaggerated scale and wherein:

Fig. 1 is a plan view of a thermoplastic pipe flange embodying one modification of the invention, and Fig. 2 is a view, partly in section, along the lines 2—2 of Fig. 1.

The pipe flange of Figs. 1 and 2 is a unitary thermoplastic molded article, circular in nature, and having a central bore 11 which is, in this instance, threaded to receive a threaded pipe. A thickened hub 18 and a wide reinforcing web, or rib, 13 around the hub and extending outwardly around the bolt holes 14 are provided to stiffen the flange. Referring to Fig. 2, the face of the flange consists of a narrow inner portion, or land, 15 surrounding and adjacent to the threaded bore 11 and lying in a plane at right angles to the longitudinal axis of the bore. The remaining, or outer, portion 16 of the flange face is inclined at a small angle in the direction of the body of the flange from the perpendicular plane of the inner portion 15 of the face. The extent of such inclination is measured by the angle A and usually amounts to from about 1° to about 5°, and preferably from about 2° to about 4°. The size of the angle A depends, of course, upon a number of factors including the size of the pipe which the flange is adapted to receive, the outside diameter and thickness of the flange, and in particular the nature of the thermoplastic material from which the flange is fabricated. Generally speaking, the angle A will be smaller the more rigid or less resilient is the material from which the flange is made, the smaller its outside diameter and the smaller the pipe which it is designed to receive. If the angle A is too small, e. g. smaller than about 1°, a leak-proof joint may not be obtained; while, if the angle is larger than about 5°, the hub of the flange may be pulled away from the threaded portion of the pipe when the flange union is tightened thus permitting leakage through the thread.

The radial width of the land or inner portion of the flange face lying in a plane perpendicular to the axis of the bore may be varied over considerable limits and, in general, will be somewhat greater for stiff, fairly rigid flanges than for those having greater resiliency. Flanges adapted to receive standard size pipe having an internal diameter up to about 3 inches and having a land with a radial width of from about ⅛ to about ⅜ inch, have been made and used with entire satisfaction. It is, of course, understood that lands having a greater or lesser radial width than this may be used if desired. A narrow chamfer 17 around the larger end of the threaded bore is useful to facilitate entry of a threaded pipe section into the bore.

In use, the flanges are simply screwed onto threaded pipe sections which it is desired to join and then bolted together in the customary fashion, the bolts being tightened evenly all around until the outer edges of the plastic flanges are firmly in contact. Sufficient stress is thus placed upon the lands of the two flanges to provide a fluid-tight seal. Gaskets are not usually necessary and are, in fact, often undesirable. Pipe cement may be used in fitting the threaded pipe section into the flange if desired.

Thermoplastic flange unions which have a leaking pressure considerably higher than the bursting pressure of pipe made from the same thermoplastic substance may be made readily when using the flange members of the present invention. The flange members may be used, however, in joining, not only thermoplastic pipe made from the same or a different thermoplastic substance from which the flange itself is made, but, also, pipe made from thermosetting substances, such as the phenol-formaldehyde condensation products and their compositions. In many instances it is also advantageous to use such plastic flange members in joining together sections of metal pipe. This is particularly true when the pipe is made from a rare or expensive metal or alloy, and the use of a flange union of the corresponding alloy would consume undesirably large quantities of the metal. Flange unions employing the thermoplastic flanges of the invention suffer substantially no decrease in leaking pressure due to cold flow of the plastic even when maintained under high working pressures for long periods of time.

In a typical instance sections of a thermoplastic 1¼ inch I. D. pipe of standard dimensions fabricated from a copolymer containing about 92 per cent by weight of vinylidene chloride and 8 per cent of vinyl chloride plasticized with 10 per cent of its weight of di-alphaphenylethyl ether were threaded and screwed into flanges molded from the same composition. The flanges had an outside diameter of 4⅝ inches and a central bore threaded to receive the 1¼ inch pipe. They were $1\frac{5}{32}$ inches thick around the bore, about ¼ inch thick outside the web, and about one inch thick through the web. The web occupied a substantial portion of the area between the thick hub surrounding the bore and the perimeter of the flange. The flanges were each provided with four symmetrically spaced ⅝ inch bolt holes through the webbed portion. The surface of the working face of each flange lay, for a distance of about $\frac{3}{16}$ inch outwardly from the bore, in a plane perpendicular to the longitudinal axis of the bore and thence outwardly to the perimeter of the flange at an angle of about 3° in the direction of the flange body with a continuation of the same plane. The flange union was assembled without a gasket and the flange bolts drawn down evenly all around until the flanges were in firm contact around their outer edges. The joined sections of pipe were then fitted with suitable connections and the assemblage tested with water under pressure. Leakage through the union occurred at about 500 pounds per square inch. After continuous subjection of the union to a working pressure of 400 pounds per square inch for three weeks no sign of leakage was evident.

In a comparative test, flanges were used having the same dimensions as those just described but having flat faces lying from the bore outwardly to the perimeter of the flange in a plane perpendicular to the longitudinal axis of the bore. The union leaked at a pressure of less than 50 pounds per square inch.

In a further comparative test, flanges were used similar to those with flat faces just described, except that they were molded with a raised land $\frac{1}{16}$ inch high and ½ inch wide immediately adjacent the bore. In this instance leakage occurred at the face of the union at a pressure of 140 pounds per square inch.

Although the flange of the invention has been described as being useful when used in pairs as companion flanges, it is obvious that solid flanges involving the novel features of the above-described bored flanges may be employed for blanking off the ends of pipe or for covering manholes, and the like. It is also apparent that, instead of threading the bore of the flange and screwing it onto a threaded pipe, the pipe and flange may be welded or joined together in any other convenient manner.

We claim:

1. A thermoplastic pipe flange adapted to be joined by means of bolts to a complementary flange, the first said flange having a central bore and a working face, the inner portion of which adjacent the bore is a plane perpendicular to the axis of the bore and the outer portion of which is inclined in the direction of the body of the flange at an angle of about 1° to about 5° from said plane surface.

2. A thermoplastic pipe flange adapted to be joined by means of bolts to a complementary flange, the first said flange having a central bore and a working face, the inner portion of which adjacent the bore is a plane perpendicular to the axis of the bore and the outer portion of which is inclined in the direction of the body of the flange at an angle of about 2° to about 4° from said plane surface.

OLIVER B. AMLEY.
JOHN B. GREGORY.